UNITED STATES PATENT OFFICE.

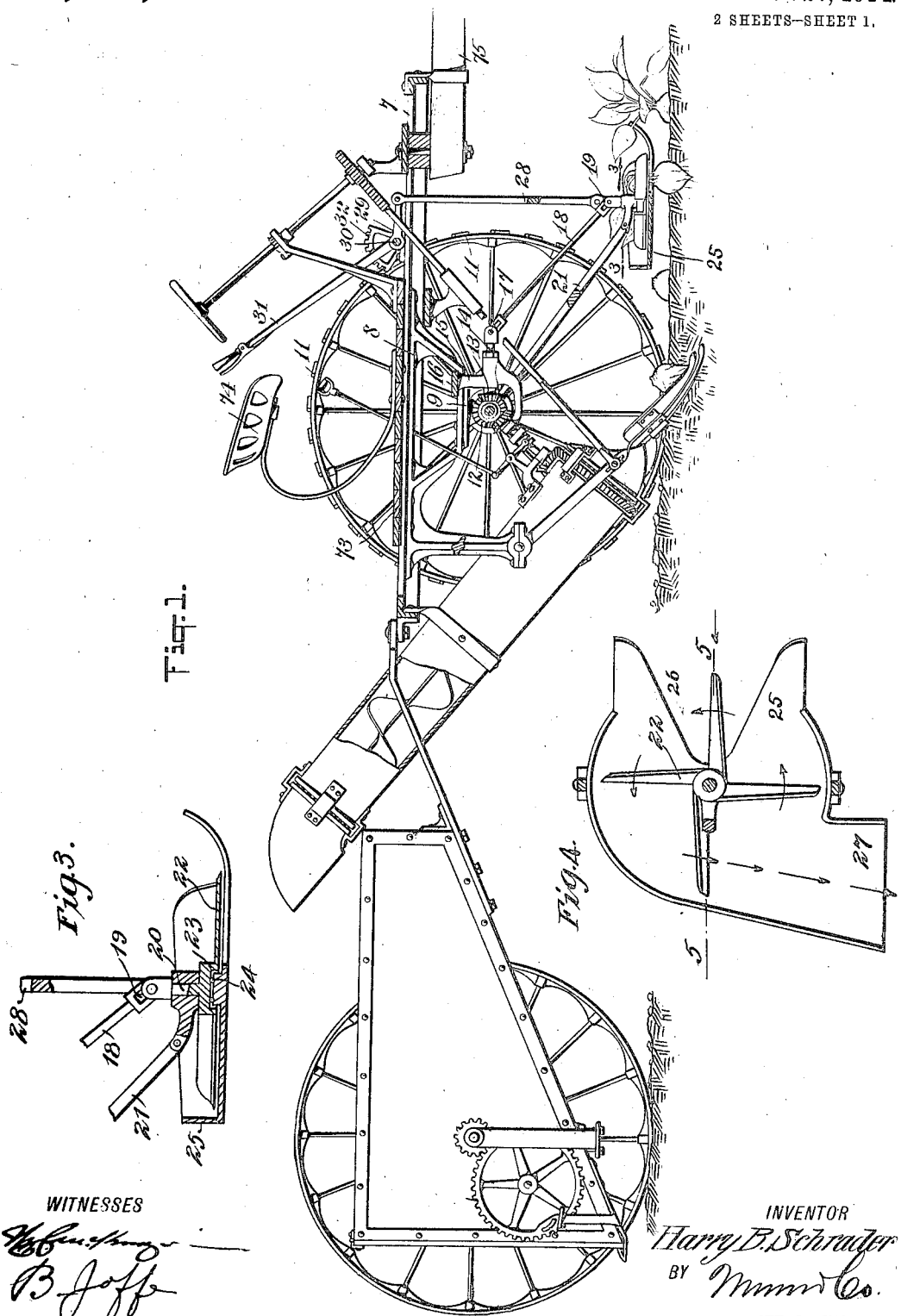

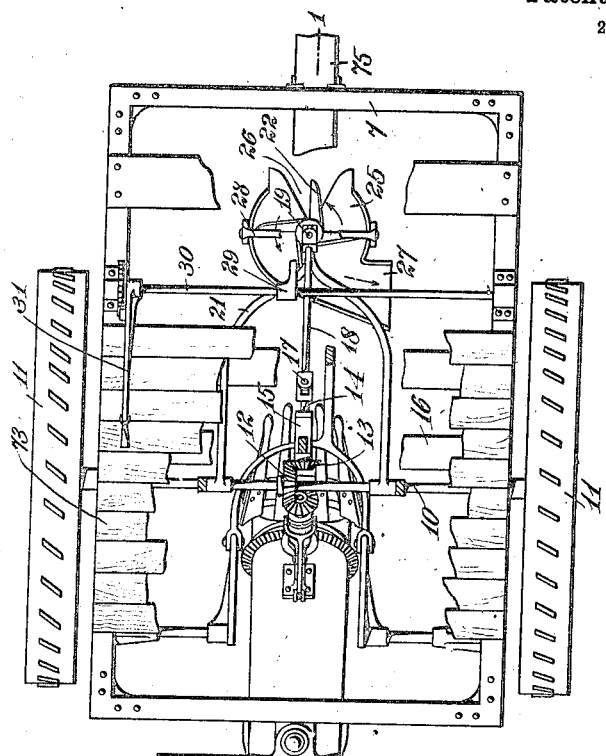

HARRY B. SCHRADER, OF STERLING, COLORADO, ASSIGNOR OF ONE-HALF TO CLARENCE D. KRAKEL, OF STERLING, COLORADO.

BEET-HARVESTER.

1,115,250.

Specification of Letters Patent. Patented Oct. 27, 1914.

Application filed July 9, 1913. Serial No. 778,073.

*To all whom it may concern:*

Be it known that I, HARRY B. SCHRADER, a citizen of the United States, and a resident of Sterling, in the county of Logan and State of Colorado, have invented a new and Improved Beet-Harvester, of which the following is a full, clear, and exact description.

My invention relates to improvements in beet harvesters and has reference more particularly to a harvester provided with a beet-top cutting mechanism.

The object of the invention is to provide a simple and inexpensive beet harvester, strong in construction, having an adjustable top-cutting mechanism.

The invention consists of the construction and combination of parts to be more fully described hereinafter and fully set forth in the claims.

Reference is to be had to the accompanying drawings forming a part of this specification, in which like characters indicate corresponding parts in all the views and in which:

Figure 1 is a longitudinal section of an embodiment of my invention on line 1—1, Fig. 2; Fig. 2 is a plan view of the same with the floor structure partly broken away to show details of construction; Fig. 3 is an enlarged horizontal section on line 3—3, Fig. 1; and Fig. 4 is a vertical section on line 4—4, Fig. 3.

Referring to the drawings, 7 represents the frame of the harvester, preferably rectangular in shape, the under surface of the longer sides of the frame being provided with brackets 8 which carry bearings 9 in which is journaled an axle 10 to the ends of which are rigidly secured wheels 11, which are external to the frame. Rigidly secured to the axle 10 is a beveled gear 12 lying substantially in the longitudinal central plane of the frame. Meshing with this beveled gear is a beveled pinion 13 carried by the shaft 14 bearing in a bracket 15, which bracket is provided with a transverse member 16 extending transversely of the frame 7 and resting on the brackets 8 to which this member is rigidly secured. The end of the shaft 14 not provided with a pinion carries a universal joint 17, to which joint is secured a rod 18 the other end of which is connected by means of a universal joint 19 to a stud shaft 20 (see Fig. 4). This shaft is journaled in an arm 21, the bifurcated end of which is adapted to swing on the axle 10. Stop rings are provided on the axle adjacent the ends of the bifurcation of the arm 21 to prevent side movement of the same on the axle. This arm 21, which lies substantially in the longitudinal central plane of the frame 7, maintains the shaft 20 substantially in the same plane.

Rigidly secured to the stub shaft 20 is a horizontal four-arm cutter 22 the under surface of which is centrally provided with a recess 23. Fitting into this recess is a projection 24 provided on the bottom of the guide 25. The recess 23 of the cutter receives balls, so that the cutter is bearing on the projection 24 of the guide. The front of the guide 25 is provided with a V-shaped cut-out 26 which guides the leaves of the beets to the cutter. The guide is also provided with a trough 27 through which the leaves cut by the cutter 22 are discharged to one side of the harvester. This guide 25 is suspended from the frame 7 of the harvester by means of a rod 28, the bifurcated end of which is secured to the guide, the opposite end being engaged pivotally to an arm 29 rigidly secured to a rod 30 disposed transversely of and on the frame 7. A controlling lever is rigidly secured to said rod 30. A toothed sector 32 is secured to the frame 7, preferably forming part of the bearing in which the rod 30 journals and which sector coöperates with the lever 31 by means of which the guide 25 can be raised or lowered with respect to the frame. To permit the guide 25 to move substantially horizontally when operated by the lever 31, the arm 21 is formed of two parts pivotally connected, the pivot being placed adjacent the end where the stub shaft 20 journals.

The frame 7 is provided with a floor 73 on which a spring seat 74 for the driver is mounted and from which seat he can operate all parts of the harvester mechanism. The frame 7 is also provided with a tongue 75 to which can be attached a tractor or horses, as desired, and by means of which the harvester is propelled.

The top-cutting mechanism, which is adjustable by means of the lever 31, becomes operative when the harvester is propelled. The rotation of the wheels 11 causes the beveled gears 12 and 13 to rotate, whereby the cutter 22 is rotated on the support 25. By means of the lever 31 the support 25 with the cutter thereon can be raised or lowered relatively to the frame 7 of the harvester and thus the cutting of the tops of the beets is adjusted.

Having thus described my invention, I claim as new and desire to secure by Letters Patent:

1. In a beet harvester, a revoluble cutter; a support for said cutter on which the same is adapted to revolve and which support constitutes a guide for beet leaves to and from said cutter; means pivotally suspending said support from the frame of the harvester; means for raising and lowering said support in a substantially vertical position, whereby said support is adjusted vertically with reference to said frame; an arm from the axle to the cutter, said arm being hinged on the axle and having a hinged portion adjacent the cutter whereby said cutter is free to move with said support when the same is moved vertically with reference to the frame; and means for transmitting the rotary movement of the axle to the cutter.

2. In a beet harvester, a top-cutting mechanism comprising a revoluble cutter; a support carrying said cutter, said support having a V-shaped cut-out at the front thereof for guiding the beet leaves to said cutter, said support having side walls forming a trough for directing the leaves cut by the cutter to the side of said support; and means for raising and lowering said support.

3. In a beet harvester, a top-cutting mechanism comprising a support having a projection, a cutter mounted on said support, said cutter having a recess engaging the projection whereby said cutter is prevented from lateral displacement on said support, said support having a V-shaped cut-out at the front thereof for guiding the beet leaves to the cutter, and side walls forming a trough to guide the leaves from the cutter to the side of said support; means for raising and lowering said support; and means for rotating said cutter when the harvester is propelled.

In testimony whereof I have signed my name to this specification in the presence of two subscribing witnesses.

HARRY B. SCHRADER.

Witnesses:
C. D. KRAKEL,
F. J. HENDERSON.